(12) United States Patent
Earling et al.

(10) Patent No.: US 9,714,144 B2
(45) Date of Patent: Jul. 25, 2017

(54) PRODUCT CONVEYING AND ACCUMULATION SYSTEM

(71) Applicants: Michael T Earling, Folsom, NJ (US); Steve Nowack, Lake Geneva, WI (US)

(72) Inventors: Michael T Earling, Folsom, NJ (US); Steve Nowack, Lake Geneva, WI (US)

(73) Assignee: Garvey Corporation, Blue Anchor, NJ (US)

( * ) Notice: Subject to any disclaimer, the term of this patent is extended or adjusted under 35 U.S.C. 154(b) by 0 days.

(21) Appl. No.: 14/978,537

(22) Filed: Dec. 22, 2015

(65) Prior Publication Data

US 2016/0185534 A1 Jun. 30, 2016

Related U.S. Application Data

(60) Provisional application No. 62/097,716, filed on Dec. 30, 2014.

(51) Int. Cl.
*B65G 47/68* (2006.01)
*B65G 47/51* (2006.01)

(52) U.S. Cl.
CPC ....... *B65G 47/684* (2013.01); *B65G 47/5145* (2013.01); *B65G 2201/0244* (2013.01)

(58) Field of Classification Search
CPC .............. B65G 47/684; B65G 47/5145; B65G 2201/0244
USPC ......... 198/347.1, 347.4, 442, 443, 452, 453, 198/580
See application file for complete search history.

(56) References Cited

U.S. PATENT DOCUMENTS

| | | | | |
|---|---|---|---|---|
| 6,575,287 B2* | 6/2003 | Garvey | ................ | B65G 47/684 198/418.6 |
| 6,612,425 B1* | 9/2003 | Garvey | .................. | B65G 23/36 198/347.1 |
| 6,959,802 B1* | 11/2005 | Garvey | ................ | B65G 47/684 198/347.1 |
| 6,964,329 B1* | 11/2005 | DiBianca | ............... | B65G 51/03 198/347.1 |
| 7,252,186 B2* | 8/2007 | Paquin | ................... | B65G 15/06 198/347.4 |

* cited by examiner

*Primary Examiner* — Gerald McClain
*Assistant Examiner* — Keith R Campbell
(74) *Attorney, Agent, or Firm* — Stuart M. Goldstein

(57) ABSTRACT

A product conveying and accumulation system utilizes multiple moving conveyors, including a first conveyor which transports product from an upstream location. A second accumulator conveyor, curvilinear in configuration, traveling at substantially the same or similar speed or a designated variable speed as the first conveyor, is aligned in the same plane as, is adjacent to, and may mate with the first conveyor at a predetermined location for contiguous movement in the same direction as the first conveyor at this predetermined location. A third accumulator conveyor is located within the curvilinear conveyor and substantially within the same transverse plane as the first and second conveyors. The presence of this third accumulator component into the conveyor system permits additional products to accumulate and circulate on and then ultimately be discharged from the conveyor system.

14 Claims, 2 Drawing Sheets

PRODUCT CONVEYING AND ACCUMULATION SYSTEM

PRIOR RELATED APPLICATION

This application claims the benefit of application Ser. No. 62/097,716, filed on Dec. 30, 2014.

BACKGROUND OF THE INVENTION

Product accumulation systems are routinely used in connection with conveyors for the storage and accumulation of product which is fed from an upstream source onto conveyors. In the normal operation of this type of system, product is placed on a conveyor at the upstream location, for instance at one operational station, and then transported to a downstream location by conveyor Where the next step in the manufacture or distribution of the product is to be accomplished.

It is not uncommon that, during this process, there may be a disruption at a downstream location caused by a malfunction of machinery, some constraining problem, or other circumstance which prevents downstream machines from accepting products. Continued operation of production upstream may result in the build-up of line back pressure which could cause a further problem in permitting the unrestricted movement of product. However, if such a disruption is one which can be addressed relatively quickly, upstream product which normally would be transported to the malfunctioning location, can be received and temporarily stored by an accumulator which is integral to the system By employing such an accumulator, the upstream machinery can continue to operate by moving product to the accumulator. Since product movement can continue, there is no build-up of line pressure. Such a system also saves the substantial time and expense which would result in having to shutdown and then restart the entire system, if no accumulator was otherwise available.

As product is being received. and retained by the accumulator, the downstream problem can be addressed. When that part of the system resumes full operation, the products stored in the accumulator are released to the downstream destination, with little downtime to the system. Products can also be received and stored at the accumulator in case there is an upstream disruption. In this case, accumulated products could be retained and sent downstream in order to keep the system operational while the upstream problem is being remedied.

U.S. Pat. No. 6,575,287 discloses a unique product conveying and accumulation system which addresses downstream product disruptions. The system utilizes a primary conveyor designed to transport products between upstream and downstream locations and an accumulator conveyor located in the same transverse plane and aligned adjacent to the primary conveyor, Upon a disruption of production downstream or other reason to stop the downstream product flow, product is diverted onto the accumulator conveyor, where the product is recycled back to the primary conveyor for ultimate distribution of product downstream. The current invention discloses a unique addition to the system shown in the '287 Patent, while continuing to utilize the basic configuration and operation of the prior system.

SUMMARY OF THE INVENTION

The present invention comprises a product conveying and accumulation system for use with products of various sizes, shapes and stability characteristics. The system comprises multiple moving conveyors, including a first conveyor which transports product from an upstream location. A second accumulator conveyor, curvilinear in configuration, traveling at substantially the same or similar speed or a designated variable speed as the first conveyor, is aligned in the same plane as, is adjacent to, and may mate with the first conveyor at a predetermined location for contiguous movement in the same direction as the first conveyor at this predetermined location. A third accumulator conveyor is located within the curvilinear conveyor and substantially within the same transverse plane as the first and second conveyors. The presence of this third accumulator component into the conveyor system permits additional products to accumulate and circulate on, and then ultimately be discharged from the system.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
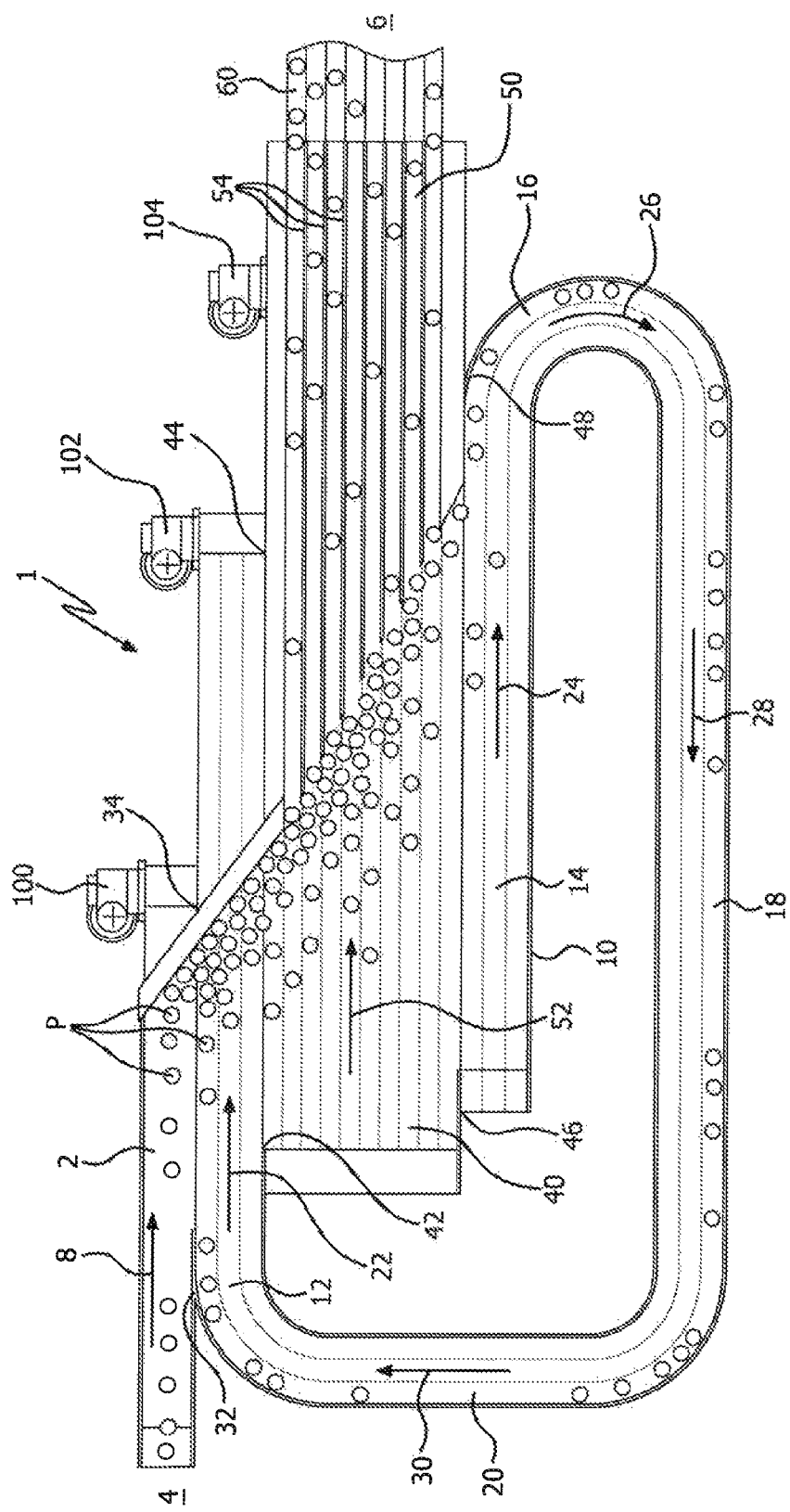
FIG. 1 is a top view of the product conveying and accumulation system of the present invention, illustrating the flow of product accumulating on and being discharged from the system.

The product conveying and accumulation system 1 of the present invention comprises first conveyor means in the form of conveyor 2 which is configured to move products from an upstream location or station designated as 4, to a downstream location or station designated as 6. Conveyor 2 moves in the direction indicated by directional arrow 8 and is set to travel at a predetermined speed. Conveyor 2 is shown in FIG. 1 as being a relatively narrow, limited product path conveyor. This conveyor could, alternatively be configured as a mass product flow conveyor.

Second conveyor means, accumulator conveyor 10, consists of a conveyor which may be constructed of interlocked segments well known in the industry. Conveyor 10 comprises accumulator sections 12 and 14 and a recirculating section comprising turn sections 16 and 20, interconnected by straight-run section 18. All of these sections make up a single, continuous conveyor path, which is completed by an underneath section (not shown) which wraps down and then up between accumulator sections 12 and 14, similar to the accumulator conveyor configuration disclosed in U.S. Pat. No. 6,575,287. The direction of travel of conveyor 10 is depicted by directional arrows 22, 24, 26, 28 and 30.

Accumulator section 12 is aligned adjacent to conveyor 2, between locations 32 and 34 and moves in the same direction as conveyor 2 between these locations. Conveyor 2 and accumulator section 12 are also located in the same transverse plane and move at the same or substantially the same speed between locations 32 and 34.

Third conveyor means, in the form of accumulator conveyor 40, is positioned between accumulator sections 12 and 14 of accumulator conveyor 10. Accumulator conveyor 40 is aligned adjacent to accumulator section 12 between locations 42 and 44 and is aligned adjacent to accumulator section 14 between locations 46 and 48. Accumulator conveyor 40 moves in the same direction 52 and at the same or substantially the similar speed as accumulator sections 12 and 14 between locations 42 and 44, and 46 and 48, For optimal operation, conveyor 2 and accumulator conveyors 10 and 40 are located in the same transverse plane. The conveyors can be set to run at the same or substantially similar speeds, when the entire system is operational, or at variable speeds, depending on the characteristic nature of the product and the speed at which product is being delivered from upstream and supplied downstream. For instance, when handling inherently unstable products, e.g. empty lightweight plastic containers, it has been found that in order to maintain such products in their upright positions, the conveyors can be operated at identical speeds. However, optimal performance for these products appears to be obtained by varying conveyor speeds only slightly. For products which are heavier and thus more stable, conveyor speeds are more dependent upon the supply of product to the accumulator system the downstream demand.

Conveyors 2, 10, and 40 are powered for linear movement by well-known drive means from motors or other suitable power sources 100, 102, and 104, respectively. Guide rails 52 are optionally provided on discharge section end 50 of accumulator conveyor 40, to align product at this section of the conveyor.

In normal operation when there is full production without disruption or constraint, conveyor 2, conveyor accumulator 10, and conveyor accumulator 40 are optimally set to run in tandem, at substantially the same, similar, or variable speeds, depending on the need as discussed above. As seen in FIG. 1, products P are delivered from upstream destination 4 and are moved by conveyor 2 onto accumulating conveyor 10. Products Which cannot be readily accepted by accumulator conveyor 10 travel to accumulator conveyor 40, where they are either discharged to downstream destination 6 as they exit conveyor accumulator 40 to discharge conveyor 60 (or equivalent product discharge means), or the accumulated products travel onto accumulator section 14 of conveyor accumulator 10. These products are then recycled back, via accumulator sections 14, 16, 18, 20, and 12 of accumulator conveyor 10. Directional arrows 26, 28, 30, 32, 22, and 24 represent the direction of motion of accumulator conveyor 10 in directing products P back to accumulator conveyor 40, where products travel in the direction indicated by directional arrow 52 towards discharge end 50 of the accumulator conveyor.

Optional guide rails 54 over accumulator conveyor 40 at its discharge end 50 align products to be discharged to downstream destination 6.

Figure 2:
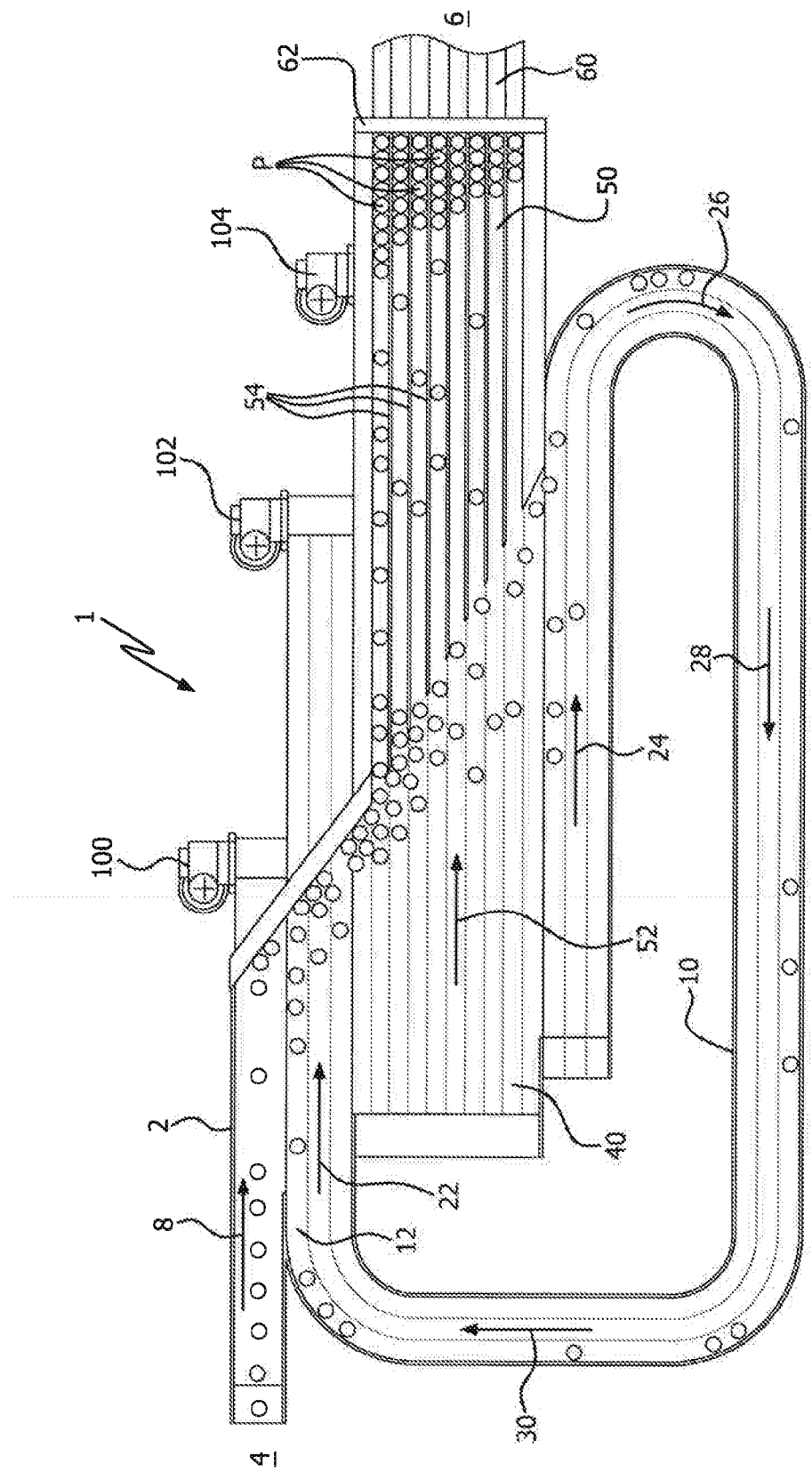
FIG. 2 is a top view of the product conveying and accumulation system of the present invention, illustrating accumulations of product as a result of a system disruption.

When there is a disruption of production downstream, continued upstream production and transport of products would normally cause an unacceptable build-up of line pressure upstream. As a result, when there is a disruption, such as a. complete stoppage or slowdown of the movement of products, in accordance with the present invention and as best seen in FIG. 2, discharge end 50 of accumulator conveyor 40 is closed off by means of gate 62 or equivalent conveyor closure device. Products entering the system via conveyor 2 are then directed onto accumulating section 12 of accumulating conveyor 10 and then onto accumulating conveyor 40, where the products continue to be transported on accumulator conveyor 40, either accumulated at discharge end 50 or recirculated around accumulated around conveyor 10. As more products are fed from upstream, an increased number of products can be accumulated and stored on accumulator conveyors 10 and 40.

The speed at which the conveying and accumulation of products operates is coordinated with and calibrated to the rate of upstream product feed, such that products will accumulate sufficiently on. accumulator conveyors 10 and 40 during the time necessary to effect repairs or otherwise remedy the downstream disruption or constraint. Since most such circumstances can be addressed within a short period, upstream production can continue during this down time.

After the disruption or stoppage of downstream production is addressed and remedied, discharge end 50 of accumulator conveyor 40 is reopened, allowing the continued flow of products to downstream destination 6. As the conveyors in the system continue to operate, products located on accumulator conveyors 10 and 40 will eventually be directed downstream for discharge. By this process, continued lull production is maintained without interruption or the need to totally shut down operation.

Certain novel features and components of this invention are disclosed in detail in order to make the invention clear in at least one form thereof, However, it is to be clearly understood that the invention as disclosed is not necessarily limited to the exact form and details as disclosed, since it is apparent that various modifications and changes may be made without departing from the spirit of the invention.

The invention claimed is:

1. A product conveying and accumulation system, said system comprising:
    first conveyor means for the movement of products from an upstream destination toward a downstream destination;
    second conveyor means for receiving products from the first conveyor means, for accumulation and movement of products on and around the second conveyor means and for movement of products toward the downstream destination, said second conveyor means comprising a single, continuous looped path, curvilinear shaped conveyor having first and second accumulator sections located in the same transverse plane, at least one accumulator section of the second conveyor means being in substantial adjacent alignment with at least one section of the first conveyor means; and
    third conveyor means for receiving products from the second conveyor means, for accumulation and movement of products on the third conveyor means, and for delivery of products to the second conveyor means and toward the downstream destination, the third conveyor means being located between the first and second accumulator sections, said third conveyor means being in the same transverse plane as and adjacently aligned with the first and second accumulator sections solely at two adjacently aligned locations, the second conveyor means and the third conveyor means moving in the same direction at the adjacently aligned locations.

2. The product conveying and accumulation system as in claim 1 wherein the first, second, and third conveyor means are all located in the same transverse plane.

3. The product conveying and accumulation system as in claim 1 wherein the first and second conveyor means move in the same direction at their adjacent alignment.

4. The product conveying and accumulation system. as in claim 2 wherein the first and second conveyor means move in the same direction at their adjacent alignment.

5. The product conveying and accumulation system as in claim 1 wherein the first, second and third conveyor means move at the same speed.

6. The product conveying and accumulation system as in claim 1 wherein the first, second and third conveyor means move at substantially similar speeds.

7. The product conveying and accumulation system as in claim 1 in which the second and third conveyor means are configured whereby products accumulate on said second and third conveyor means when there is a stoppage or slowdown in the rate of the movement of products to the downstream destination.

8. The product conveying and accumulation system as in claim 1 further comprising guide rail means on the third conveyor means for aligning products on said third conveyor means.

9. A product conveying and accumulation system, said system comprising:
   first conveyor means for the movement of products from an upstream destination toward a downstream destination;
   second conveyor means for receiving products from the first conveyor means, for accumulation and movement of products on and around the second conveyor means and for movement of products toward the downstream destination, said second conveyor means comprising a single, continuous looped path, curvilinear shaped conveyor having first and second accumulator sections; the conveyor path being substantially located in the same transverse plane as the first conveyor means, at least one accumulator section of the second conveyor means being in substantial adjacent alignment with at least one section of the first conveyor means, both conveyor means, when in adjacent alignment, moving in the same direction; and
   third conveyor means for receiving products from the second conveyor means, for accumulation and movement of products on the third conveyor means, and for delivery of products to the second conveyor means and toward the downstream destination, the third conveyor means being located between the first and second accumulator sections, said third conveyor means being in the same transverse plane as and adjacently aligned with the first and second accumulator sections solely at two adjacently aligned locations, the second conveyor means and the third conveyor means moving in the same direction at the adjacently aligned locations.

10. The product conveying and accumulation system as in claim 9 wherein the second and third conveyor means are located in the same transverse plane.

11. The product conveying and accumulation system as in claim 9 the first second and third conveyor means move at the same speed.

12. The product conveying and accumulation system as in claim 9 wherein the first, second and third conveyor means move at substantially similar speeds.

13. The product conveying and accumulation system as in claim 9 in which the second and third conveyor means are configured whereby products accumulate on said second and third conveyor means when there is a stoppage or slowdown in the rate of the movement of products to the downstream destination.

14. The product conveying and accumulation system as in claim 9 further comprising guide rail means on the third conveyor means for aligning products on said third conveyor means.

* * * * *